United States Patent Office 3,430,134
Patented Feb. 25, 1969

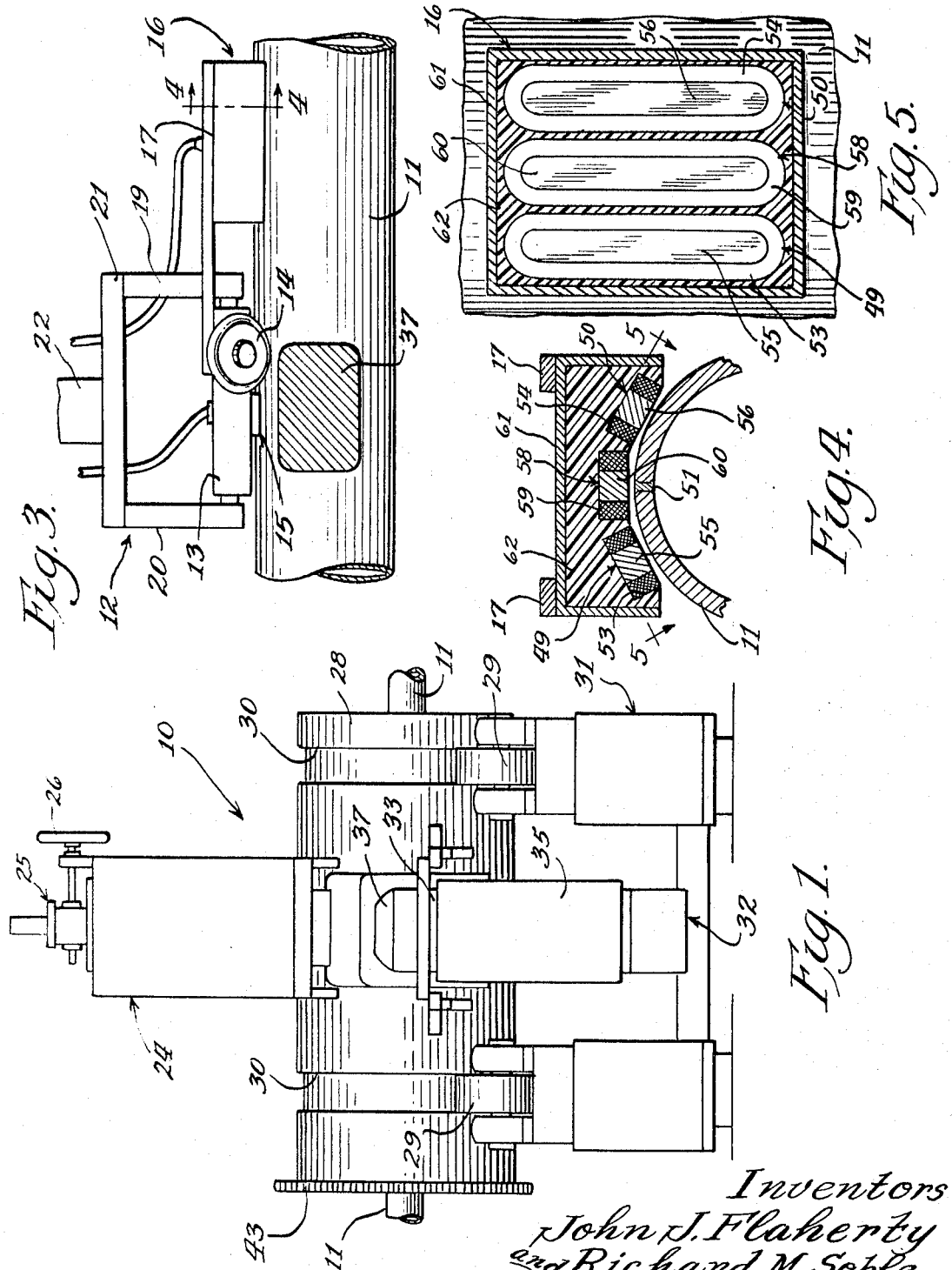

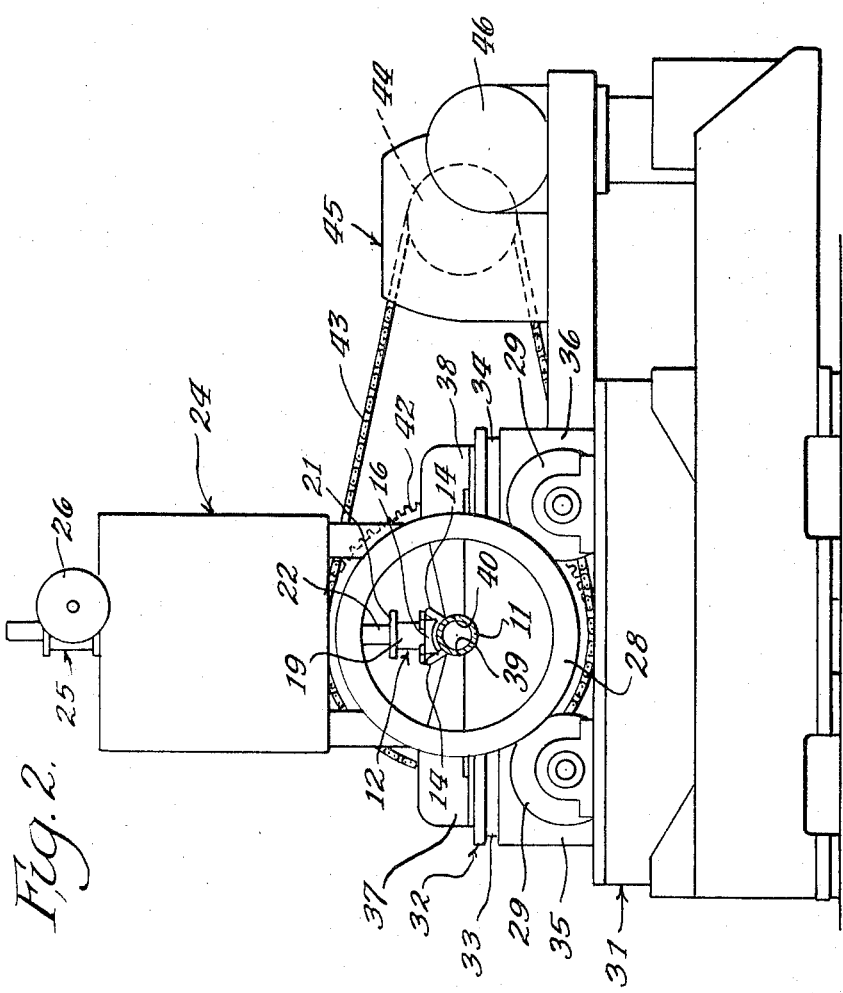

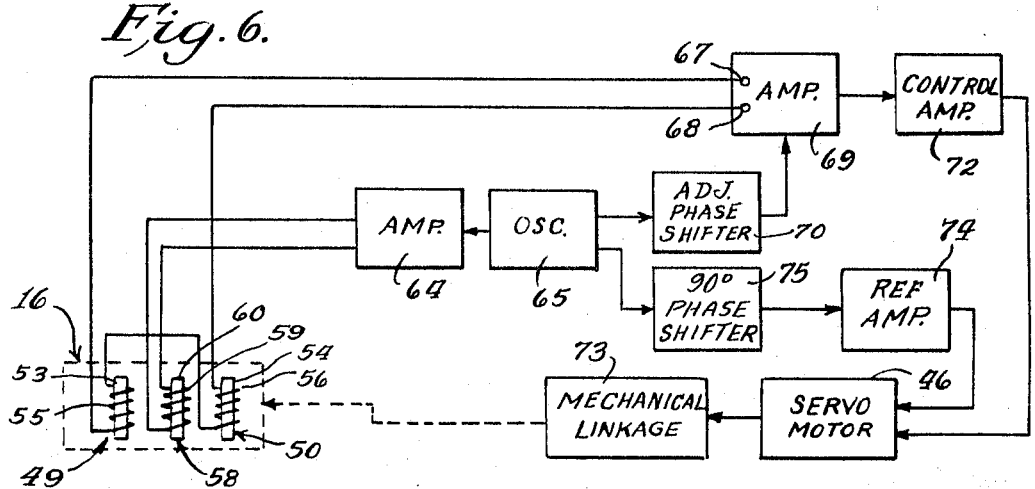
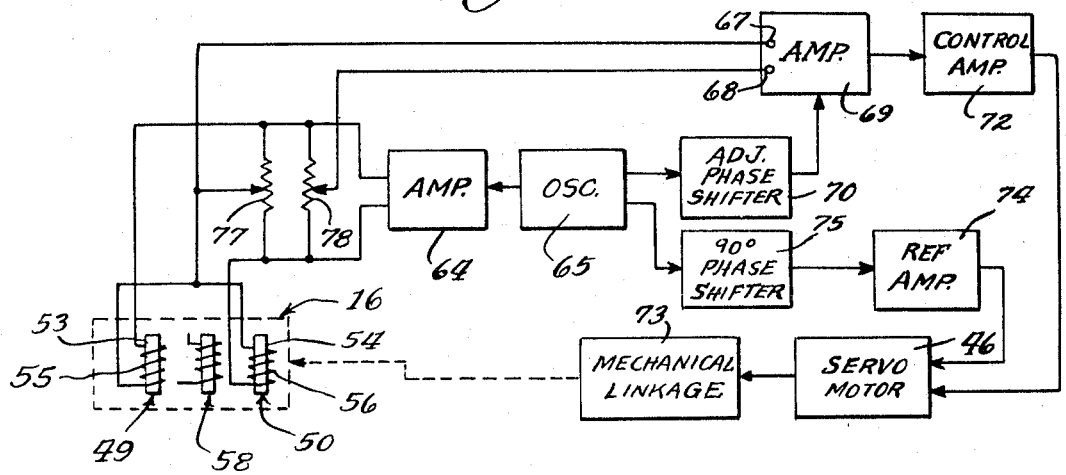
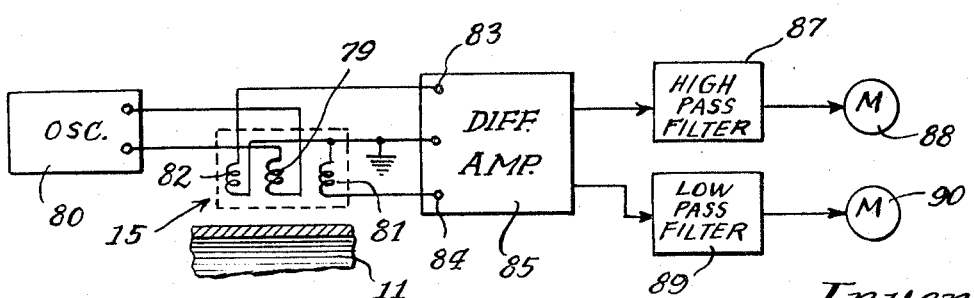

3,430,134
WELD TRACKER SYSTEM HAVING MAGNETI-CALLY ISOLATED PICKUP COILS
John J. Flaherty and Richard M. Soble, Elk Grove Village, Ill., assignors to Magnaflux Corporation, Chicago, Ill., a corporation of Delaware
Filed Aug. 26, 1966, Ser. No. 575,316
U.S. Cl. 324—40　　　　　　　　　　　　　15 Claims
Int. Cl. G01r 33/14; B23k 9/12

ABSTRACT OF THE DISCLOSURE

System particularly designed for testing a pipe having a welded seam in which a pair of eddy current coils are spaced apart a distance sufficient to provide a high degree of magnetic isolation but with an overlap in the areas of sensitivity thereof only in the region of an intermediate reference plane. An AC current is applied to both coils or to an intermediate existing coil and the pair of coils are connected to develop an AC signal having a phase and amplitude corresponding to the direction and magnitude of displacement of a welded seam from the reference plane. The signal is amplified and applied to one winding of a two phase electric motor which operates to rotate the coils about the pipe axis to automatically track the weld. Eddy current and leakage field means are provided to test the weld.

---

This invention relates to a weld tracker system and more particularly to a system having means for sensing and indicating the location of welds in pipes or other parts with a high degree of sensitivity and accuracy. The system of this invention is comparatively simple and straightforward in construction and operation and is highly reliable and trouble-free. Important features of the invention reside in the provision of means for automatically tracking the weld and in the provision of non-destructive testing means for automatically testing the weld to detect and indicate defects therein.

Various tracking systems have heretofore been proposed for tracking a seam between parts to be welded together, but such systems have not been highly sensitive and have not been capable of tracking welds. In one type of prior art seam tracking system, a high frequency AC source is connected to a first coil disposed over a seam between two parts with its axis normal to the surfaces of the part and another coil is disposed within the first coil with an axis transverse to the axis of the first coil and to the seam, the second coil being coupled to a phase detector operative through a servo amplifier for controlling movement of the coils to track the seam. This type of arrangement can be used to track a seam to control movement of a welding tool, but it is more complex than is desirable and it has limited sensitivity and accuracy such that welds could not be detected and tracked.

In another type of system a high frequency AC source is connected to the two parts to be welded with a pair of coils on opposite sides of the seam, connected through an amplifier to a phase detector which is connected through an amplifier to a motor for controlling movement of the coils. This type of arrangement also has limited sensitivity and accuracy, while being more complex than is desirable.

In a further type of arrangement, coils are disposed on cores of magnetic material having tips disposed adjacent parts on opposite sides of a seam, the coils being energized from a high frequency source and being connected to a rectifier circuit operative to energize a servo amplifier for controlling tracking movement. This arrangement is also more complex than would be desirable, and has limited accuracy and sensitivity.

In still another type of system, a pair of core members of magnetic material are disposed in parallel relation on opposite sides of a seam, with a first pair of coils thereon connected to an AC source and with another pair of coils thereon connected through an amplifier to one phase winding of a two phase motor used to control tracking movement, the core members being of laminated construction and being L-shaped to provide a small gap therebetween. This arrangement is simpler than the other described arrangements, but as in the other arrangements, the sensitivity and accuracy are limited.

In yet another type of prior art arrangement, a generally U-shaped core member is provided with the ends of legs thereof being positioned adjacent parts on opposite sides of a seam therebetween, with a coil on the bight portion of the core being connected to an AC source and with coils on the leg portions being connected to a phase-sensitive detector to develop a signal which is applied through a servo amplifier to a motor used to control tracking movement. In this arrangement, as in the other described arrangements, the sensitivity and accuracy are limited.

This invention was evolved with the general object of providing a weld tracker to automatically position a nondestructive inspection device over a weld or at a fixed distance from a weld, to permit accurate and reliable indication of flaws or defects in the weld.

Another object of the invention is to provide a means for sensing and indicating the position of a weld or any other thin elongated line portion of a part having magnetic characteristics different from the magnetic characteristics of adjacent portions of a part, with a sensitivity and accuracy greater than is obtained with the seam tracking systems of the prior art.

According to this invention, a pair of eddy current coils are provided having cores at equal distances from an intermediate reference plane with the spacing between the cores being sufficient to minimize magnetic coaction between the coils and to provide an overlap in the areas of sensitivity thereof only in the region of the intermediate reference plane. Means are provided connected to a source of alternating current of a certain frequency for inducing eddy currents in the part to induce corresponding voltages in the coils and to develop at output terminals connected to the coils an AC signal having a phase and amplitude corresponding to the direction and magnitude of displacement of the intermediate reference plane from a weld. With this arrangement, it is possible to obtain sufficient sensitivity and accuracy to locate a weld, which is not possible in practice with the seam tracking systems of the prior art. It will be appreciated that the difference between the magnetic characteristics of a weld and the characteristics of adjacent portions of a part is considerably less than the difference between the magnetic characteristic of an open seam and the magnetic characteristic of adjacent portions of parts defining the seam. Thus a system might be satisfactory for use in detecting a seam but may be inoperable with respect to a weld. It will be understood, however, that the invention is not necessarily limited to the sensing and indicating of the location of a weld, and may be used for sensing and indicating the location of a seam or of any other elongated line portion of a part having magnetic characteristics different from the magnetic characteristics of adjacent portions of a part.

In accordance with a specific feature of the invention, the cores are disposed in generally parallel relation to each other and to the intermediate reference plane to be generally normal to the surface of the part.

In one preferred embodiment of the invention, the eddy currents are induced by means of a third coil having a core centered on the intermediate reference plane, in spaced relation between the pair of coils, the third coil being connected to an AC source. With this embodiment, an extremely high degree of sensitivity and accuracy is obtained.

In another embodiment of the invention, the pair of coils are connected to an AC source, preferably with the cores being generally parallel to each other and to the reference plane and with the connection of the coils to the AC source being such that the instantaneous magnetic polarization of the ends of both of the cores adjacent the part are the same. This arrangement has the advantage of being simpler than the three-coil arrangement but is considerably less sensitive, so that it is preferred only in applications where high sensitivity is not a primary requirement.

The cores can be simply coil forms of non-magnetic, non-conductive coil form material, but preferably and in accordance with an important feature of the invention, the cores are of a ferrite material, which greatly increases the sensitivity, and increases the amplitude of the signal produced by the coils.

Still another important feature of the invention is in the elongation of the cores in a direction generally parallel to the intermediate reference plane. With this arrangement, the effective area of sensitivity of the coils can be greatly increased while maintaining an optimum spacing between the coils, to greatly increase sensitivity. An additional advantage is that the part of the weld or other line portion which is sensed can be of substantial length, to provide an integrating effect, and so as not to sense minor discontinuities in the weld or other line portion.

A still further feature of the invention is in the use of the system in testing a pipe with a welded seam, with electric motor means being controlled from the sensing coils for moving the coils about the axis of the pipe.

Another very important feature of the invention relates to the use of the system in non-destructive testing, with testing means supported in fixed relation to the position-sensing coils. Preferably, the testing means includes an eddy current probe positioned adjacent the position-sensing coils for detecting defects in a weld or the like.

In accordance with a further feature, the system may be used in controlling the position of magnet means, supported in fixed relation to the coils to develop a magnetic field extending transversely through a weld. Preferably, the testing means includes leakage field detection means for detecting discontinuities in the magnetic field which extends transversely through the weld.

This invention contemplates other and more specific objects, features and advantages which will become more fully apparent from the following detailed description taken in conjunction with the accompanying drawings which illustrate preferred embodiments and in which:

FIGURE 1 is a side elevational view of pipe testing apparatus incorporating a weld tracking system constructed in accordance with the principles of this invention;

FIGURE 2 is an end elevational view of the pipe testing apparatus of FIGURE 1;

FIGURE 3 is a side elevational view, on an enlarged scale, of a testing probe and tracking probe assembly of the apparatus of FIGURE 1;

FIGURE 4 is a sectional view taken substantially along line IV—IV of FIGURE 3;

FIGURE 5 is a sectional view taken substantially along line V—V of FIGURE 4;

FIGURE 6 is a schematic diagram of a tracking circuit used in the apparatus of FIGURE 1;

FIGURE 7 is a schematic diagram of a modified form of tracking circuit usable in the pipe testing apparatus of FIGURE 1; and FIGURE 8 is a schematic diagram of testing circuitry used in the pipe testing apparatus of FIGURE 1.

Reference numeral 10 generally designates pipe testing apparatus constructed in accordance with the principles of this invention. The illustrated apparatus 10 is particularly designed for testing a weld of a steel pipe 11 but it will be understood that the invention can be applied to the tracking of any elongated line portion which has electromagnetic characteristics differing from the electromagnetic characteristics of adjacent portions of a part and can be used in conjunction with flat plate or structures of other configurations. For example, the invention can be applied in testing and locating of welds in plates of non-ferrous material.

The apparatus 10 includes a testing probe and tracking probe assembly generally designated by reference numeral 12 which includes a carriage 13 on which a pair of rollers 14 are journalled for engagement with the pipe 11, a testing probe 15 being supported on the carriage 13 at a position between the rollers 14, and a tracking probe 16 being supported from the carriage 13 through a pair of forwardly extending bars 17.

The carriage 13 is supported between a pair of plates 19 and 20, for pivotal movement about an axis parallel to the axis of the pipe 11, the upper ends of plates 19 and 20 being affixed to a plate 21 which is affixed to the end of a shaft 22. The shaft 22 is supported of axial movement, toward or away from the pipe 11, in a support structure 24. Such movement may be controlled by a mechanism 25, operated by a hand wheel 26, or may be controlled by fluid-operated means.

The support structure 24 is affixed to the wall of a rotatable cylindrical support 28, which is generally coaxial to the pipe 11 in surrounding relation thereto. The cylindrical support 28 is supported by means of four rollers 29 the peripheries of which extend into annular grooves 30 in the wall of the cylindrical support 28. Rollers 29 are suitably journalled on a stationary frame structure generally designated by reference numeral 31, the rollers 29 being freely rotatable about spaced axes in a horizontal plane.

The apparatus 10 is particularly designed for the testing of a welded seam of the pipe 11 and the test probe 15 includes coils for detecting flaws or defects in the welded seam, by testing the response to eddy currents and also by detecting leakage fields, produced across cracks in the weld, when a magnetic flux is passed therethrough. To produce the magnetic flux for the leakage field testing and also to improve the eddy current testing under some conditions, a generally U-shaped magnetic yoke structure 32 is provided having legs 33 and 34 on which magnetizing coils 35 and 36 are provided, with pole members 37 and 38 projecting through openings in the wall of the cylindrical member 28 and having concave cylindrical end faces 39 and 40 for engagement with opposite sides of the pipe 11, to pass a magnetic flux through the weld seam being tested.

The magnetic yoke structure 32 is affixed to and carried by the support cylinder 28.

During the testing operation, the pipe is moved axially through the apparatus by suitable means, not shown, with the direction of movement being preferably to the right as viewed in FIGURE 1. During such movement, the position of the welded seam may vary widely and it is for this reason that the probe assembly 12 and the magnetizing yoke structure are supported from the cylinder 28 which is supported by the rollers 29 for rotation about the axis of the pipe. In accordance with this invention, the tracking probe 16 detects the position of the weld and develops an electrical signal which is used for automatically controlling rotation of the support cylinder 28 so that the test probe 15 is always accurately positioned over the weld in the pipe 11.

To rotate the support cylinder 28, a sprocket wheel 42 is affixed on one end thereof and a chain 43 is entrained on the wheel 42 and on a sprocket wheel 44, driven through a gear reduction unit 45 from an electric motor 46 which is preferably a two phase motor, reversible by reversing the phase of an AC voltage applied to one of the windings.

Referring to FIGURES 4 and 5, the tracking probe 16 comprises a pair of eddy current coils 49 and 50, arranged for disposition in proximity to the wall of the pipe 11 on opposite sides of the weld therein, the weld zone being indicated by reference numeral 51 in FIGURE 4. The coils 49 and 50 include windings 53 and 54 on cores 55 and 56 which are spaced at equal distances from an intermediate reference plane which extends through the axis of the pipe and which normally extends through the weld 51 during proper operation of the system. The spacing between the cores 55 and 56 is sufficient to minimize magnetic coaction between the coils and to provide an overlap in the areas of sensitivity thereof only in the region of the intermediate reference plane.

Means are provided for inducing eddy currents in the pipe 11 to induce corresponding voltages in the coils 49 and 50 and to develop at output terminals connected thereto an AC signal having a phase and amplitude corresponding to the direction and magnitude of displacement of the weld 51 from the reference plane mid-way between the coils 49 and 50. For this purpose, a third coil 58 is provided, including a winding 59 on a core 60 which is centered on the intermediate reference plane with the coil 58 being mid-way between the coils 49 and 50. Winding 59 is connected to an AC source to develop eddy currents in the pipe 11 and to induce corresponding voltages in the windings 53 and 54.

The provision of the third coil 58 is highly advantageous in providing extremely high sensitivity such that the weld can be sensed and located with a high degree of accuracy.

The cores 55, 56 and 60 can be of a non-magnetic, non-conductive material but preferably and in accordance with a specific feature of the invention, the cores 55, 56 and 60 are of a ferrite material which results in a substantial increase in the sensitivity.

According to another important feature of the invention, the cores 55, 56 and 60 are elongated in a direction parallel to the intermediate reference plane and parallel to the weld 51. With this arrangement, the effective area of sensitivity of the coils 49 and 50 is greatly increased while an optimum spacing is obtained therebetween, to provide greatly increased sensitivity. In addition, the part of the weld which is sensed is of substantial length to provide an integrating or averaging effect such that minor discontinuities in the weld have minimal effect.

To support the coils 49, 50 and 58 in proper relationship, they are disposed within a housing 61, by means of a suitable potting compound 62. In construction, a thin sheet of a suitable material may be disposed against the surface of a pipe, and the coils may then be positioned by hand until optimum balance and performance are obtained. The housing 61 may then be disposed over the coils, and the potting compound may then be supplied into the housing and allowed to set, to fix the positions of the coils.

Referring now to FIGURE 6, the winding 59 of the center coil 58 is connected to the output of an amplifier 64 having an input connected to the output of an oscillator 65. The windings 53 and 54 of the coils 49 and 50 are connected differentially or in series opposition to input terminals 67 and 68 of an amplifier 69, which form output terminals of the probe 16. An additional input of the amplifier 69 is connected to the output of a phase shifter 70 having an input connected to an output of the oscillator 65. The output of the amplifier 69 is connected to the input of a control power amplifier 72 having an output connected to one of the phase windings of the motor 46, the motor 46 being mechanically connected to the probe 16 through a mechanical linkage 73 which in the apparatus illustrated in the drawings includes the gear reduction mechanism 45 and the chain 43. The other winding of the two phase motor 46 is connected to the output of a reference power amplifier 74 having an input connected to the output of a 90 degree phase shifter 75, the input of the phase shifter 75 being connected to an output of the oscillator 65. In operation, when the probe 16 is centered over the weld 51 and the pipe 11, the voltages induced in the windings 53 and 54 from eddy currents in the pipe 11 are substantially equal and because of the differential connection thereof, no output is developed at the terminals 67 and 68 of the amplifier 69 and no power is applied to the control winding of the servo motor 46. Thus the motor 46 is stationary. However, if the weld shifts in one direction away from the reference plane of the probe 16, an output voltage is developed by the probe 16 having a phase dependent upon the direction of the displacement and having an amplitude corresponding to the magnitude of the displacement. The voltage so developed is amplified through the amplifiers 69 and 72 and is applied to the control winding of the servo motor 46 to energize the motor 46 in a direction such as to move the probe unit toward a position in which the intermediate reference plane thereof is aligned with the weld. With displacement in the opposite direction, a signal of reverse phase is developed at the terminals 67 and 68 and the control winding of the motor 46 is energized in a reverse direction. Thus the probe is automatically centered over the weld 51 and since the testing probe 15 is movable with the tracking probe 16, the testing probe is also accurately centered over the weld 51.

The exact position may be controlled by adjustment of the phase shifter 70 to produce a null output voltage when the probe 16 is in the desired relation to the weld 51 in the pipe 11. It is noteworthy that the system may be operated at conventional power frequencies such as 420 cycles or 60 cycles. A direct connection to a power line may be made instead of providing the oscillator 65 and the amplifier 64 and also the amplifier 74 may not be required in that case.

FIGURE 7 is a schematic diagram of a modified arrangement wherein the center coil 58 is not used and wherein the eddy currents are induced in the pipe by connecting the windings 53 and 54 of the coils 49 and 50 in series to the output of the amplifier 64. The connection of the windings 53 and 54 to the amplifier 64 is such that the instantaneous magnetic polarization of the ends of both of the cores 55 and 56 which are adjacent the pipe 11, is the same. For example, when the applied AC current is of one polarity, north magnetic poles may be produced at the ends of the cores 55 and 56 which are adjacent the surface of the pipe 11. With this feature, there is minimum interaction between the coils.

To apply an output signal from the coils 49 and 50 to the amplifier 69 in the arrangement of FIGURE 7, the junction between the windings 53 and 54 is connected to the terminal 67 of the amplifier 69 and also to the movable contact of a potentiometer 77, connected between the output terminals of the amplifier 64. The input terminal 68 of amplifier 69 is connected to the movable contact of a potentiometer 78, also connected between the output terminals of the amplifier 64. The potentiometers 77 and 78 are adjusted to produce a null output from the amplifier 69 when the probe is in a centered position relative to the weld 51 of the pipe 11.

With proper adjustment, the modified arrangement of FIGURE 7 is capable of providing sensitivity sufficient to track the normal weld in pipe. It has the advantage that only two coils are required. However, the sensitivity obtained with the three coil arrangement is much greater and the three coil arrangement is generally preferred in applications such as in weld tracking where maximum sensitivity and accuracy are required.

FIGURE 8 is a schematic diagram of testing circuitry used in the apparatus 10. As shown, the probe 15 comprises a primary coil 79 connected to the output of an oscillator 80 and a pair of secondary coils 81 and 82 which are differentially connected to input terminals 83 and 84 of a differential amplifier 85. The output of the differential amplifier 85 is applied through a high pass filter 87 to a meter 88 and also through a low pass filter 89 to a meter 90, it being understood that indicating means other than meters, such as recorders or the like, can be used.

In operation, if the weld is uniform, the voltages induced in the secondary coils 81 and 82 from eddy currents in the weld are substantially equal so that no output is produced from the differential amplifier 85. However, a flaw passing under one of the secondary coils 81 or 82 will produce an output signal from the differential amplifier 85 and produce an indication on the meter 88. The differential amplifier 85 also amplifies low frequency variations such as produced by leakage fields across cracks in the weld, as a result of the magnetization obtained by use of the magnetic yoke 32. Such low frequency variations are passed through the low pass filter 89 to be indicated on the meter 90. As illustrated, the coils 79, 81 and 82 are located with their axes in parallel relation generally normal to the pipe and in a plane extending through the axis of the pipe and through the weld seam. It will be appreciated, however, that other orientations are possible. In any case, it is very important that the coils be accurately centered over the weld to be tested in order to obtain a reliable testing of the weld. This is accomplished through the illustrated tracking system and particularly through the high degree of sensitivity and accuracy which is possible with the tracking probe as illustrated.

It will be understood that modifications and variations may be effected without departing from the spirit and scope of the novel concepts of this invention.

We claim as our invention:

1. In a system for use with a part including a thin elongated line portion having electromagnetic characteristics different from the electromagnetic characteristics of adjacent portions of the part, a pair of eddy current coils having cores at equal distances from an intermediate reference plane, the spacing between said cores being sufficient to minimize magnetic coaction between said coils and to provide an overlap in the areas of sensitivity thereof only in the region of said intermediate reference plane, said coils being arranged for disposition with ends of said cores thereof in proximity to surface portions of said part on opposite sides of said line portion thereof, the region between the opposite ends of said cores being principally composed of non-magnetic material to provide a high degree of magnetic isolation of said coils, a pair of output terminals, means connecting said coils to said output terminals, a source of AC of a certain frequency, and means connected to said source for inducing eddy currents in said part to induce corresponding voltages in said coils and to develop at said output terminals an AC signal of said certain frequency having a phase and amplitude corresponding to the direction and magnitude of displacement of said line portion from said intermediate reference plane.

2. In a system as defined in claim 1, said cores being disposed in generally parallel relation to each other and to said intermediate reference plane to be generally normal to the surface of said part.

3. In a system as defined in claim 1, said inducing means including a third coil having a core centered on said intermediate reference plane in spaced relation between said pair of coils, and means connecting said third coil to said AC source.

4. In a system as defined in claim 1, said inducing means including means connecting said pair of coils to said AC source.

5. In a system as defined in claim 4, said cores being generally parallel to each other and to said reference plane to be generally normal to the surface of said part, with the connection of said coils to said AC source being such that the instantaneous magnetic polarization of the ends of both of said cores adjacent said part are the same.

6. In a system as defined in claim 1, said cores being of a ferrite material.

7. In a system as defined in claim 1, both of said cores being elongated in a direction generally parallel to said intermediate reference plane and generally parallel to said thin elongated line portions.

8. In a system as defined in claim 1, electric motor means for effecting relative movement between said coils and said part in a direction transverse to said reference plane and to said line portion of said part, and amplifier means having an input connected to said output terminals and an output connected to said electric motor means for energizing said motor means in a direction to align said reference plane with said line portion.

9. In a system as defined in claim 8, phase adjustment means for controlling the relative position between said coils and said part at which a null occurs in the output voltage of said amplifier means.

10. In a system as defined in claim 8, non-destructive testing means supported in fixed relation to said coils for inspection of said line portion of said part.

11. In a system as defined in claim 10, said part being a pipe with a welded seam constituting said line portion, and said electric motor means being effective for moving said coils and said testing means about the axis of said pipe.

12. In a system as defined in claim 11, said testing means including an eddy current probe positioned adjacent said pair of coils for detecting defects in said weld.

13. In a system as defined in claim 11, magnet means supported in fixed relation to said coils and said non-destructive testing means and arranged to develop a magnetic field extending transversely through said weld.

14. In a system as defined in claim 13, said testing means including leakage field detection means.

15. In a system for testing a pipe having a welded seam, a probe assembly including a testing probe and a tracking of said welded seam, means including two phase electric motor means for rotating said probe assembly about the axis of said pipe, a source of AC of a certain frequency, means for applying a first signal from said AC source to one phase of said electric motor means, amplifier means for applying a second signal to the other phase of said motor means, phase shift means for producing a 90 degree phase shift between said signals, said tracking probe including a pair of eddy current coils having cores at equal distances from an intermediate reference plane in approximate alignment with the axis of said pipe and having ends in proximity to surface portions of said pipe on opposite sides of said welded seam thereof, means connecting said coils to said amplifier means, a third coil having a core centered on said intermediate reference plane in spaced relation between said pair of coils, the region between the ends of all said cores which are opposite the ends thereof which are adjacent said pipe being principally composed of a non-magnetic material, and means connecting said third coil to said AC source for inducing eddy currents in said part to induce corresponding voltages in said pair of coils and to apply to said other phase of said electric motor means an AC signal of said certain frequency having a phase and amplitude corresponding to the direction and magnitude of displacement of said weld seam from said intermediate reference plane, to automatically center said tracking probe and said testing probe on said welded seam.

References Cited

UNITED STATES PATENTS

| | | |
|---|---|---|
| 2,971,079 | 2/1961 | Sommeria. |
| 3,271,664 | 9/1966 | Mountz et al. _____ 324—40 |
| 3,359,486 | 12/1967 | Brosious. |
| 3,346,807 | 10/1967 | Wood et al. _____ 324—37 |

RUDOLPH V. ROLINEC, *Primary Examiner.*

A. E. SMITH, *Assistant Examiner.*

U.S. Cl. X.R.

219—125